United States Patent

Porri et al.

Patent Number: 5,128,295
Date of Patent: Jul. 7, 1992

[54] CATALYST AND PROCESS FOR THE POLYMERIZATION AND COPOLYMERIZATION OF ALPHA-OLEFINS

[75] Inventors: Lido Porri; Antonino Giarrusso, both of Milan; Bluetta Salsi, Parma; Rosa A. Marin, Busto Arsizio; Francesco Masi, San Donato, all of Italy

[73] Assignee: Enichem Anic S.p.A., Palermo, Italy

[21] Appl. No.: 561,088

[22] Filed: Aug. 1, 1990

[30] Foreign Application Priority Data

Aug. 3, 1989 [IT] Italy ............... 21439 A/89

[51] Int. Cl.$^5$ ............... C08F 4/646
[52] U.S. Cl. ............... 502/117; 526/150; 585/522; 585/524
[58] Field of Search ............... 526/150, 165; 502/117

[56] References Cited

U.S. PATENT DOCUMENTS 2,820,778  1/1958  Spaenig et al. ............... 526/165
4,931,417  6/1990  Miya et al. ............... 526/351

Primary Examiner—Joseph L. Schofer
Assistant Examiner—David Wu
Attorney, Agent, or Firm—Hedman, Gibson & Costigan

[57] ABSTRACT

Alpha-olefin polymers and copolymers are prepared by polymerizing the monomers in the presence of a catalyst obtained by bringing into contact:
a) a compound definable by the formula:

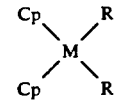

wherein:
M is represents a metal of group $4\beta$ of the periodic table of elements;
each R independently represents halogen atom; a linear or branched $C_1$–$C_{10}$ alkyl group; or an aryl group; and
each Cp independently represents the cyclopentadienyl, indenyl or fluorenyl, group, possible carrying one or more $C_1$–$C_4$ alkyl substituents, which Cp groups can also be connected together by a carbon atom or alkylsilane bridge structure;
b) a trialkylaluminium: T,20
wherein each R' independently represents a linear or branched $C_1$–$C_{10}$ alkyl group, or an aryl group; and
c) a distannoxane:

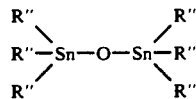

where each R" independently reprepsent a linear or branched $C_1$–$C_6$-alkyl group, or an aryl group; the molar ratio of component (b) to component (a) being less than about 700,000/1 and the molar ratio component (c) to component (b) being less tha 1/1.

The catalyst is active in the homopolymerization of ethylene, propylene and higher alpha-olefins, in the copolymerization of ethylene with propyllene or with a higher alpha-olefin, and in the terpolymerization of ethylene, propylene and diene.

12 Claims, No Drawings

CATALYST AND PROCESS FOR THE POLYMERIZATION AND COPOLYMERIZATION OF ALPHA-OLEFINS

This invention relates to a catalyst and process for the polymerization and copolymerization of alpha-olefins. It is known in the art to polymerize ethylene or general alpha-olefins by the low-pressure Ziegler process. For this purpose catalysts used are generally formed from a compound of a transition metal (group 3B to group 2B elements of the periodic table), mixed with an organometallic compound or hydride of group 1a to group 3a elements of the periodic table, operating in suspension or solution, or in the absence of solvents or diluents. A particular class of known catalysts active in olefin polymerization is the combination of an aluminoxane with a cyclopentadienyl derivative of a metal such as titanium, zirconium or hafnium (group 4b). For this known art; reference should be made to the descriptions of J. Boor, "Ziegler-Natta Catalysts and polymerization", Academic Press, New York (1979); and H. Sinn. W. Kaminsky, Adv. Organomet. Chem. 18 99 (1980). These catalysts have the advantage of high catalytic activity and the ability to produce stereoregular polyolefins. The main drawbacks, which have so far prevented the large-scale commercial use of these catalysts, are basically the difficulty of synthesizing aluminoxanes and obtaining them in reproducible form, and thus the difficulty of preparing catalysts and polymers with properly reproducible characteristics. Aluminoxanes are compounds containing Al-O-Al bonds with various O/Al ratios. They are generally prepared by reacting an aluminium alkyl or an aluminium alkyl halide under strictly controlled conditions with water, and in the case of aluminium trimethyl also with a hydrated salt such as aluminium sulphate hexadecahydrate, copper sulphate pentahydrate or iron sulphate heptahydrate. The preparation of aluminoxanes is laborious and gives a yield of less than 50%. Their structure is not properly known and the preparation methods so far described always produce mixtures of compounds of different molecular weight.

According to the present invention, it has now been found that a system consisting of a cyclopentadienyl derivative of a group 4b metal of the periodic table of elements and a trialkylaluminum, which itself is little active in alpha-olefin polymerization, can be activated by simple contact with metered quantities of a distannoxane. It has also been found that the thus activated catalyst has perfectly reproducible characteristics, which can be regulated according to the nature of the constituents and the constituent ratio, so as to be useful in the polymerization and copolymerization of alpha-olefins to produce a wide range of polymers with desired characteristics.

It should be noted that certain distannoxanes are used in the art as catalyst components in olefin polymerization, as described for example by N. M. Karayannis et al. in Makromol. Chem. 186 1181 (1985), in U.S. Pat. No. 3,449,263 and in CA 71 39626 (1969) and CA 77 6956 (1972). In these catalysts the distannoxane performs a different function from that of the catalyst of the present invention, from which they therefore differ.

In accordance therewith, a first aspect of the present invention is a catalyst for alpha-olefin polymerization and copolymerization, prepared by bringing into contact:

a) a compound definable by the formula:

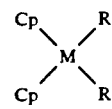

where:
M represents a metal of group 4b of the periodic table of elements;
each R independently represents a halogen atom; a linear or branched $C_1$-$C_{10}$ alkyl group; or an aryl group; and
each Cp independently represents the cyclopentadienyl, indenyl or fluorenyl group, possibly carrying one or more linear or branched $C_1$-$C_4$ alkyl substituents, which Cp groups can also be connected together by a carbon atom or alkylsilane bridge structure;

b) a trialkylaluminium:

where each R' independently represents a linear or branched $C_1$-$C_{10}$ alkyl group, or an aryl group; and c) a distannoxane:

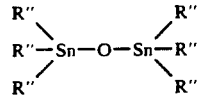

where each R" independently represents a linear or branched $C_1$-$C_6$ alkyl group, or an aryl group; the molar ratio of component (b) to component (a) varying from about 100/1 to about 700,000/1 and the molar ratio of component (c) to component (b) being less than 1/1.

In component (a) of the catalyst according to the present invention, the metal (M) is chosen from titanium, zirconium and hafnium, with a preference for zirconium and hafnium, each R is preferably a chlorine atom or a $C_1$-$C_8$ alkyl group, and each Cp is preferably chosen from non-substituted cyclopentadienyl, indenyl and fluorenyl groups.

If the two Cp groups of component (a) are connected together by a bridge structure, the bridge is preferably formed from a linear or branched $C_1$-$C_4$ alkylene group or a dialkylsilyl group, preferably dimethylsilyl.

Examples of bridge-connected Cp groups are the ethylenebis(cyclopentadienyl), ethylenebis(indenyl), isopropyl(cyclopentadienyl-1-fluorenyl) and dimethylsilylbis(cyclopentadienyl) groups, which have the following respective formulas:

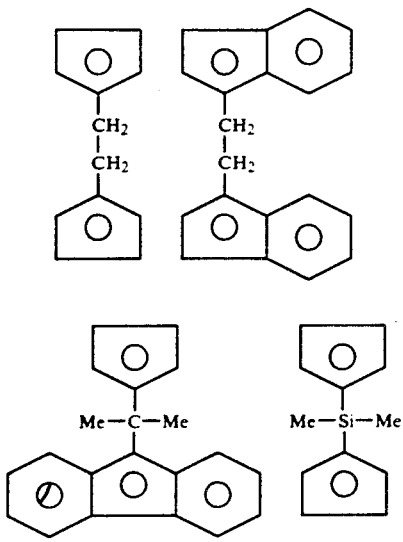

(where Me=methyl).

Specific examples of compounds (a) are therefore bis(cyclopentadienyl) zirconium dichloride; bis(cyclopentadienyl) hafnium dichloride; bis(cyclopentadienyl) zirconium octyl chloride; bis(cyclopentadienyl) hafnium dimethyl; ethylene-bis(indenyl) zirconium dichloride; ethylene-bis(indenyl) hafnium dichloride; and isopropyl(cyclopentadienyl-fluorenyl) hafnium dichloride. Component (b) of the catalyst of the present invention is a trialkylaluminum in which R' contains preferably between 1 and 4 carbon atoms. Trimethylaluminum is preferred.

Component (c) of the catalyst of the present invention is a distannoxane in which R" is preferably the methyl group. In the catalyst of the present invention, the molar ratio of component (b) to component (a) varies preferably from about 300/1 to about 300,000/1, the upper end of this range being particularly suitable in the homopolymerization and the lower end in the copolymerization of ethylene. The ratio of component (c) to component (b) can vary from 0.3/1 to 0.9/1, the preferred ratio being of the order of 0.7/1–0.8/1.

The three components of the catalyst of the present invention are critical with regard to the catalyst activity, and in fact a binary system comprising only the components (a) and (b) has very low activity, and a binary system comprising only the components (a) and (c) is totally inactive.

The catalyst of the present invention is prepared by simply bringing the three constituents into contact in an inert organic solvent, in particular an aromatic or aliphatic hydrocarbon such as toluene, hexane or heptane, operating at ambient temperature. Alternatively, the solvent used can be the actual monomer if liquid or liquefiable under the reaction conditions. There is no need to heat or age the catalyst component mixture.

The order in which the components are added is not critical. However, in a preferred method of operation, component (b) is dissolved in the chosen organic solvent, component (c) is then added and finally component (a), in the aforesaid ratios. In each case a solution of the catalyst in the hydrocarbon solvent is obtained.

The catalyst can be formed either in the polymerization reactor or outside it, in the absence or presence of the olefin to be polymerized.

The catalyst of the present invention can be used in the polymerization of ethylene to give linear polyethylene or to polymerize propylene or higher alpha-olefins to give atactic, syndiotactic or isotactic isomers, according to the chosen component (a). The catalyst is also active in the copolymerization of ethylene with propylene and/or other alpha-olefins (formation of LLDPE) and in the terpolymerization of ethylene, propylene and diene.

Specifically, these polymerizations are conducted using the suspension method, in an inert organic solvent, especially in an aliphatic or aromatic hydrocarbon solvent, at a temperature generally varying from 20° to 250° C., at atmospheric pressure or under an olefin partial pressure of up to about 150 bars, possibly in the presence of a polymer molecular weight regulator.

The advantages of the catalyst according to the present invention are their ability to polymerize or copolymerize any alpha-olefin to give polymers with controlled characteristics, in the high activity demonstrated in such polymerizations and in the overall simplicity compared with catalysts which use an aluminoxane component.

The experimental examples given hereinafter are provided to better illustrate the present invention.

In the experimental examples 1-20, which were conducted at atmospheric pressure, the polymerization reactions are performed in a double-wall reactor with a five-cone head, and provided with a mechanical stirrer, dip tube for feeding gas, dropping funnel for adding the solvent and reactants, a thermometer and a cock for connection to a conventional vacuum-argon line or alternatively to gas discharge. A liquid temperature-controlled at the desired temperature is circulated through the interspace.

EXAMPLES 1-5

After removing the air, 100 ml of anhydrous toluene, 0.19 ml of trimethylaluminum and the quantity of distannoxane $(Me_3Sn)_2O$ (Me=methyl) given in table I are fed into the reactor. The reactor is temperature-controlled at 50° C., the solution is saturated with ethylene (20 l/hour for 10 minutes) and finally 0.06 ml of a solution of bis(cyclopentadienyl) zirconium dichloride $Cp_2ZrCl_2$ in toluene (concentration 1 mg/ml) ($[Zr]=2.10^{-6}$ moles/liter) are added. The mixture is kept stirring at 50° C. for 30 minutes while continuing to bubble in ethylene. The polymerization is then interrupted with 5 ml of methanol and, after halting the gas flow, the reaction mixture is added to 600 ml of methanol containing 5 ml of concentrated HCl. The precipitated polymer is separated by filtration, washed twice with mnethanol and dried by evaporating the solvent under reduced pressure. Table 1 shows the polymerization results, obtained by operating with various molar trimethylaluminum/distannoxane ratios expressed as O/Al ratios.

In Example 5, which is for comparison, only traces of polymer form.

TABLE 1

| Ex. | $(Me_3Sn)_2O$ (ml) | O/Al (moles) | Polyethylene yield (g) | Productivity (t/mol.-Zr. hour) | M.W. ($\times 10^{-3}$) |
|---|---|---|---|---|---|
| 1 | 0.11 | 0.25 | 1 | 10 | — |

TABLE 1-continued

| Ex. | $(Me_3Sn)_2O$ (ml) | O/Al (moles) | Polyethylene yield (g) | Productivity (t/mol.-Zr. hour) | M.W. ($\times 10^{-3}$) |
|---|---|---|---|---|---|
| 2 | 0.15 | 0.35 | 1.8 | 18 | — |
| 3 | 0.22 | 0.50 | 2.2 | 22 | 36 |
| 4 | 0.32 | 0.75 | 3.1 | 31 | 130 |
| 5 | 0.43 | 1 | — | — | — |

The productivity is expressed in tonnes of polymer per mole of zirconium per hour.

EXAMPLE 6

The procedure of Example 4 is followed (O/Al ratio = 0.75), but adding the monomer (ethylene) lastly to the solution containing the three catalyst components. A polyethylene yield of 2.95 g is obtained, with a productivity of 29.5 tonnes of polymer per mole of Zr per hour.

EXAMPLES 7-9

The procedure of Example 4 is followed (O/Al ratio = 0.75), but ageing the trimethylaluminum/distannoxane mixture for various times. Specifically, the trimethylaluminum/distannoxane mixture is kept stirring in the relative solvent for the times indicated in Table 2 before heating to 50° C. and adding the other reactants.

TABLE 2

| Ex. | Ageing time (hrs) | Polyethylene yield (g) | Productivity (t/mol.-Zr. hour) | M.W. ($\times 10^{-3}$) |
|---|---|---|---|---|
| 7 | 1 | 3.03 | 30 | 150 |
| 8 | 3 | 2.95 | 29 | — |
| 9 | 4 | 2.71 | 27 | 100 |

EXAMPLE 10

The procedure of Example 4 is followed (O/Al ratio = 0.75), but using 0.46 moles of $(Et_3Sn)_2O$ (Et = ethyl) instead of $(Me_3Sn)_2O$. A polyethylene yield of 1.65 g is obtained, with a productivity of 16.5 tonnes of polymer permole of Zr per hour.

EXAMPLE 11

The procedure of Example 4 is followed but using heptane as solvent instead of toluene and increasing the bis(cyclopentadienyl) zirconium dichloride concentration to $5.1 \times 10^{-5}$ moles/liter (1.5 mg). A polyethylene yield of 3.6 g is obtained (molecular weight 80,000), with a productivity of 1.5 tonnes of polymer per mole of Zr per hour.

EXAMPLE 12 (COMPARISON)

As comparison with catalysts of the known art, the polymerization of Example 4 is repeated using 1.45 ml of a 10 weight % solution in toluene of aluminoxane $(AlOMe)_{19}$ (Me = methyl) (the product HMW-MAO of the Schering Co.) instead of trimethylaluuminum and distannoxane. A polyethylene yield of 0.87 g is obtained, with a productivity of 8.7 tonnes of polymer per mole of Zr per hour.

EXAMPLE 13 (COMPARISON)

As comparison with catalysts of the known art, the polymerization of Example 11 is repeated using 1.45 ml of a 10 weight % solution in toluene of aluminoxane $(AlOMe)_{19}$ (Me = methyl) (the product HMW-MAO of the Schering Co.) instead of trimethylaluminum and distannoxane. A polyethylene yield of 1.4 g is obtained, with a productivity of 0.5 tonnes of polymer per mole of Zr per hour.

EXAMPLE 14

The procedure of Example 4 is followed but using the same concentration of bis(cyclopentadienyl) zirconium octyl chloride CpZrCl(octyl) instead of $Cp_2ZrCl_2$. A polytheylene yield of 1.5 g is obtained, with a productivity of 15 tonnes of polymer per mole of Zr per hour.

EXAMPLE 15 (COMPARISON)

As comparison with catalysts of the known art, the polymerization of Example 14 is repeated using 1.45 ml of a 10 weight % solution in toluene of aluminoxane $(AlOMe)_{19}$ (Me = methyl) (the product HMW-MAO of the Schering Co.) instead of trimethylaluminum and distannoxane. A polyethylene yield of 1.5 g is obtained, with a productivity of 15 tonnes of polymer per mole of Zr per hour.

EXAMPLES 16-18

In these examples a catalyst system formed from bis(cyclopentadienyl) hafnium dimethyl $Cp_2HfMe_2$, trimethylaluminum and distannoxane $(Me_3Sn)_2O$ (Me = methyl) is used. The ethylene polymerization is conducted in the same manner as in the preceding examples, maintaining the concentration of the hafnium compound constant at $6.8 \times 10^{-5}$ moles/liter and varying the ratio of the aluminum component to the tin component as indicated in Table 3, in which the results are summarized. In the comparison Example 18, only small quantities of polymer are formed.

TABLE 3

| Ex. | $(Me_3Sn)_2O$ (ml) | O/Al (moles) | Polyethylene yield (g) | Productivity (t/mol.-Hf. hour) |
|---|---|---|---|---|
| 15 | 0.22 | 0.50 | 0.33 | 0.1 |
| 16 | 0.32 | 0.75 | 2.54 | 0.75 |
| 17 | 0.43 | 1 | — | — |

The productivity is expressed in tonnes of polymer per mole of Hf per hour.

EXAMPLE 19

The procedure of Example 17 is followed but using bis(cyclopentadienyl) hafnium dichloride $Cp_2HfCl_2$ instead of $Cp_2HfMe_2$ at the same concentration. A polyethylene yield of 2.42 g is obtained with a molecular weight of 740,000, and with a productivity of 0.7 tonnes of polymer per mole of Hf per hour.

EXAMPLE 20 (COMPARISON)

As comparison with catalysts of the known art, the polymerization of Example 19 is repeated using 1.45 ml of a 10 weight % solution in toluene of aluminoxane $(AlOMe)_{19}$ (Me = methyl) (the product HMW-MAO of the Schering Co.) instead of trimethylaluminum and distannoxane. A polyethylene yield of 0.3 g is obtained, with a productivity of 0.09 tonnes of polymer per mole of Hf per hour.

EXAMPLE 21

A double-walled 1 liter pressure vessel fitted with a mechanical stirrer, thermometer, pressure gauge and two inlets, one for gases and the other for solvent and reactants, is used. After removing the air, the pressure vessel is filled with ethylene at atmospheric pressure and ambient termperature, after which 350 ml of anhydrous toluene containing 1 ml of trimethylaluminum and 1.6 ml of distannoxane (Me$_3$Sn)$_2$O (Me= methyl) (O/Al ratio=0.71) are added. After 60 minutes the pressure vessel is temperature-controlled at 55° C. and 0.2 ml of a solution of bis(cyclopentadienyl) zirconium dichloride Cp$_2$ZrCl$_2$ in toluene (150 ml) (contentration 1 mg/ml) ([Zr]=1.37×10$^{-7}$ moles/liter) are added. Finally, the pressure vessel is connected to an ethylene line at a pressure of 8 bars and the mixture is kept stirring (600 r.p.m.) at 55° C. After one hour the ethylene feed is halted, the pressure vessel is depressurized to 1 bar, and 15 ml of methanol are added to interrupt polymerization. The polymerization mixture is poured into 3 liters of ethanol containing butylhydroxytoluene. The precipitated polymer is washed several times with ethanol and finally dried under vacuum at 60° C. 24 g of polyethylene are obtained with a molecular weight of 130,000 and a productivity of 44 tonnes of polymer per mole of Zr per hour per bar of ethylene.

EXAMPLE 22

In this example the apparatus of Examples 1-20 is used for the copolymerization of ethylene and propylene. The two ethylene and propylene flows are measured with flowmeters and then combined before entering the reactor. Specifically, after removing the air, 100 ml of anhydrous toluene, 0.19 ml of trimethylaluminum and 0.32 ml of distannoxane (Me$_3$Sn)$_2$O (Me= methyl) are fed into the reactor. The reactor is temperature-controlled at 25° C., the solution is saturated with a mixture of ethylene and propylene (10 and 40 liters/hour respectively, for 20 minutes) and finally 0.24 ml of a solution of 1 mg/ml of bis(cyclopentadienyl) zirconium dichloride Cp$_2$ZrCl$_2$ in toluene ([Zr]=8.2×10$^{-6}$ moles/liter) are added. The mixture is kept stirring at 25° C. for 60 minutes while continuing to bubble in the two monomers. The polymerization is then interrupted with 5 ml of methanol and, after halting the gas flow, the reaction mixture is poured into 600 ml of methanol containing 5 ml of concentrated HCl. The precipitated copolymer is separated by filtration, washed twice with methanol and dried by evaporating the solvent under reduced pressure. In this manner 2 g of ethylen-propylene copolymer are recovered with a propylene content of 60% by weight and with a productivity of 2.4 tonnes of polymer per mole of Zr per hour.

EXAMPLE 23

The apparatus of Examples 1-20 is used. After removing the air, 300 ml of anhydrous toluene containing 1 ml of trimethylaluminum, 1.7 ml of distannoxane (Me$_3$Sn)$_2$O (Me= methyl) (O/Al ratio=0.76) and 200 mlof propylene are added. The reactor is temperature-controlled at 30° C., and 1 ml of a solution of raceme ethylene bis(indenyl) zirconium dichloride Et-(ind)$_2$ZrCl$_2$ in toluene (conendtration 1 mg/ml) ([Zr]=4.8×10$^{-6}$ moles/liter) is added. The mixutre is kept stirring (600 r.p.m.) at 30° C. for 3 hours, after which 15 ml of methanol are added to interrupt the polymerization. The mixture is then poured into an excess of methanol to interrupt the polymerization. The precipitated polymer is washed several times with methanol and finally dried under vacuum at 60° C. 20 g of isotactic crystalline polypropylene are obtained, with a productivity of 2.8 tonnes of polymer per mole of Zr per hour.

EXAMPLE 24

The procedure of Example 23 is followed but using, instead of the zirocnium compound, 1.26 ml of a solution of ethylene bis(indenyl) hafnium dichloride Et-(ind)$_2$HfCl$_2$ in toluene (concentration 1 mg/ml) ([Zr]=4.98×10$^{-6}$ moles/liter), operating at 50° C. 12 g of isotactic crystalline polypropylene are obtained, with a productivity of 1.6 tonnes of polymer per mole of Hf per hour.

EXAMPLE 25

The apparatus of Examples 1-20 is used. After removing the air, 0.32 ml of trimethylaluminum, 0.53 ml of distannoxane (Me$_3$Sn)$_2$O (Me= methyl) (O/Al ratio=0.74), 250 ml of propylene and 2.1 ml of a solution of isopropenyl (cyclopentadienyl-fluorenyl) hafnium dichloride in toluen (concentration 1 mg/ml) ([Hf]=1.61×10$^{-5}$ moles/liter), at room temperature, are added. The reactor is then temperature-controlled at 50° C., the mixture is kept stirring (600 r.p.m) for 60 minutes, and finally 15 ml of methanol are added to interrupt the polymerization. The mixture is then poured into an excess of methanol, the precipitated polymer is washed several times with methanol and finally dried under vacuum at 60° C. 12 g of essentially syndiotactic polypropylene are obtained, with a productivity of 3 tonnes of polymer per mole of Zr per hour.

We claim:
1. A catalyst for alpha-olefin polymerization and copolymerization, prepared by bringing into contact:
a) a compound of the formula:

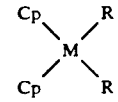

where:
M represents a metal of group 4b of the periodic table of elements;
each R independently represents a halogen atom; a linear or branched C$_1$-C$_{10}$ alkyl group; or an aryl group; and
each Cp independently represents a cyclopentadienyl, indenyl or fluorenyl group, possibly carrying one or more linear or branched C$_1$-C$_4$ alkyl substituents, which Cp groups can also be connected together by a carbon atom or alkylsilane bridge structure;
b) a trialkylaluminum:

where each R' independently represents a linear or branched C$_1$-C$_{10}$ alkyl group; or an aryl group; and
c) a distannoxane:

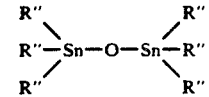

where each R" independently represents a linear or branched $C_1-C_6$ alkyl group or an aryl group; in a molar ratio or component (b) to component (a) varying from about 100/1 to about 700,000/1 and in a molar ratio of component (c) to component (b) of less than 1/1.

2. A catalyst as claimed in claim 1, wherein said component (a), the metal (M) is selected from the group consisting of titanium, zirconium ahd hafnium, and each R represents a chlorine atom or a $C_1-C_8$ alkyl group.

3. A catalyst as claimed in claim 1, wherein in said component (a) the Cp groups are connected together by a linear or branched $C_1-C_4$ alkylene group or a dialkylsilyl group.

4. A catalyst as claimed in claim 3, wherein said dialkylsilyl group comprises dimethylsilyl.

5. A catalyst as claimed in claim 1, wherein said component (a) is selected from the group consisting of bis(cyclopentadienyl) zirconium dichloride; bis(cyclpentadienyl) hafnium dichloride; bis(cyclopentadienyl) zirconium octyl chloride; bis(cyclopentadienyl) hafnium dimethyl; ethylene-bis(indenyl) zirconium dichloride; ethylene-bis(indenyl) hafnium dichloride; and isopropyl(cyclopentadienyl-1-fluorenyl) hafnium dichloride.

6. A catalyst as claimed in claim 1, wherein in said component (b) each R' represents a $C_1-C_4$ alkyl group.

7. A catalyst as claimed in claim 1, wherein said component (b) is trimethylaluminum.

8. A catalyst as claimed in claim 1, wherein in said component (c) each R" represents a methyl group.

9. A catalyst as claimed in claim 1, wherein the molar ratio of component (c) to component (b) varies from 0.3/1 to 0.9/1.

10. A catalyst as claimed in claim 1, wherein the molar ratio of component (b) to component (a) varies from about 300/1 to about 300,000/1 and the molar ratio of component (c) to component (b) varies from 0.7/1-0.81.

11. A process for preparing a catalyst as claimed in claim 1, comprising bringing the constituents (a), (b) and (c) into mutual contact in an inert organic solvent and operating at ambient temperature.

12. A process as claimed in claim 11, wherein said inert organic solvent is an aliphatic or aromatic hydrocarbon, or the actual monomer itself if said monomer is liquid or liquefiable under the reaction conditions.

* * * * *